United States Patent [19]

Melillo

[11] 4,146,321
[45] Mar. 27, 1979

[54] REVERSIBLE FILM CARTRIDGE AND CAMERA

[76] Inventor: Dominic S. Melillo, 129 Marmora Rd., Parsippany, N.J. 07054

[21] Appl. No.: 822,706

[22] Filed: Aug. 8, 1977

[51] Int. Cl.² .................... G03B 17/00; G03B 17/02; G03B 17/26
[52] U.S. Cl. ................................ 354/203; 354/159; 354/275
[58] Field of Search ............... 354/204, 205, 212, 213, 354/275, 120, 159, 222, 202, 203; 352/79, 80, 82, 83

[56] References Cited

U.S. PATENT DOCUMENTS

| 684,221 | 10/1901 | Gill | 354/275 |
|---|---|---|---|
| 689,751 | 12/1901 | Robertson | 354/213 |
| 706,245 | 8/1902 | Louden | 354/159 |
| 1,263,588 | 4/1918 | Miyake et al. | 354/275 |
| 2,091,826 | 8/1937 | Menger | 354/203 X |
| 3,347,142 | 10/1967 | Steisslinger | 354/275 |
| 3,440,943 | 4/1969 | Sauer | 354/205 X |
| 3,471,223 | 10/1969 | Langone | 352/83 X |
| 3,482,681 | 12/1969 | Nerwin et al. | 354/275 X |
| 3,678,834 | 7/1972 | Melillo | 354/159 |
| 3,745,899 | 7/1973 | Walther | 354/213 |

FOREIGN PATENT DOCUMENTS

| 1278224 | 9/1968 | Fed. Rep. of Germany | 354/275 |
|---|---|---|---|
| 1045786 | 7/1953 | France | 354/159 |

*Primary Examiner*—Donald A. Griffin

[57] ABSTRACT

A film cartridge includes two like film spools in a pair of symmetrical casings held in a spaced relationship by support means such as a side support bar or a hinged reusable cartridge case. An opening in the back of the cartridge between the two casings permits the pressure plate inside the back cover of the camera to hold the film tightly against the film aperture guide. The ends of the film are attached to both spools and the cartridge is reversible to permit exposures along two separate rows across the width of the film. Cooperating aperture and viewing masks limit the exposures to each row in succession as the film is advanced and then reversed. Larger rectangular or square frames across the width of the film may also be used without reversal of the film. The side openings in the cartridge case and extensions on both ends of the spools are symmetrical so that either side can engage the film driving mechanism. The usual sprocket gear, built in spool, and need for rewinding of a standard 35mm camera are eliminated, as well as the film sprocket holes, to permit utilization of larger areas of the film and simplification of the camera construction.

9 Claims, 8 Drawing Figures

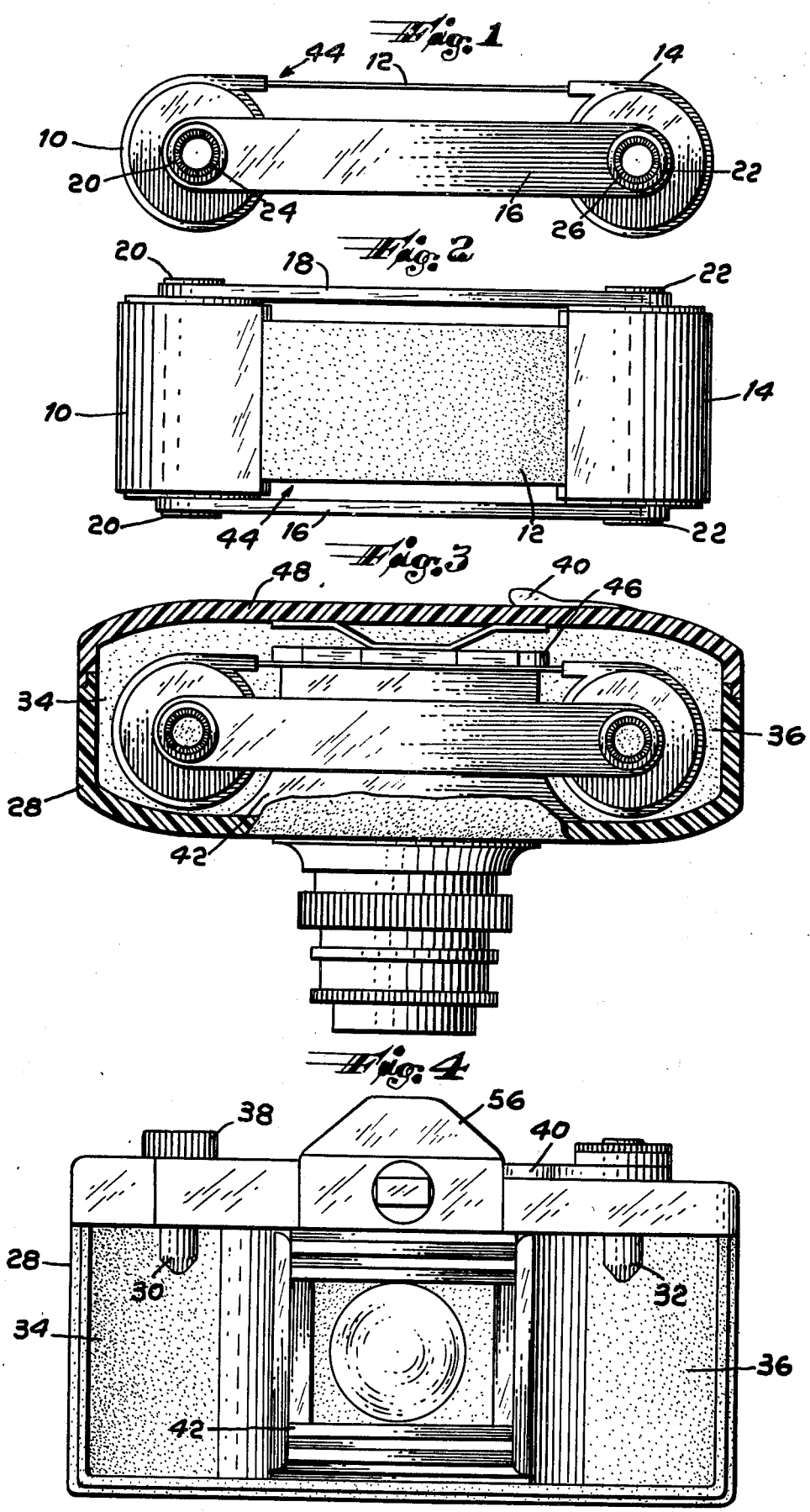

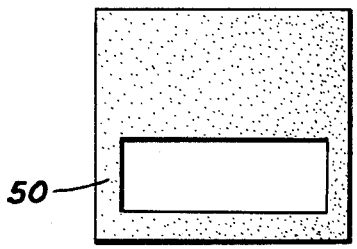
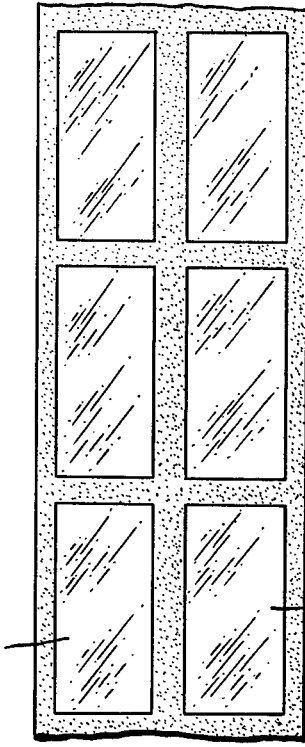
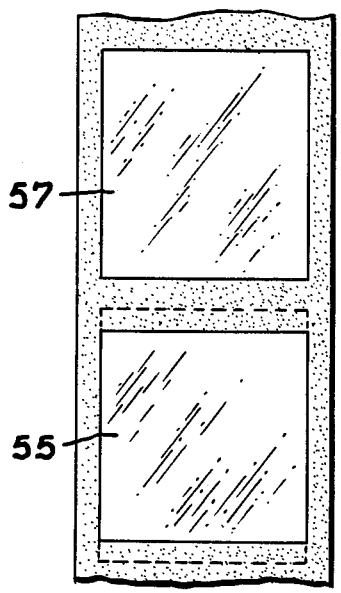
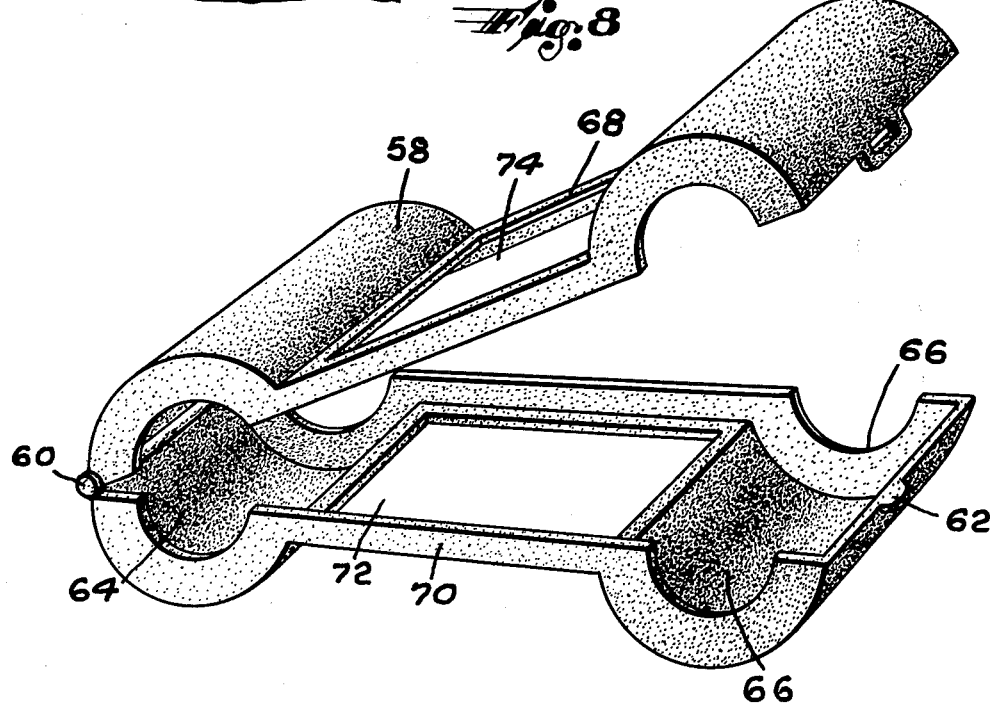

REVERSIBLE FILM CARTRIDGE AND CAMERA

BACKGROUND OF THE INVENTION

1. Field of the Invention

The present invention relates to an improved film cartridge and camera and particularly to a reversible cartridge case and film to provide additional or larger exposures with greater use of the film area and a simplified camera structure.

2. Statement of Prior Art

Present 35mm cameras generally employ film with sprocket holes along the edges which engage a sprocket drive wheel for advancing the film. The film is contained in a single light tight casing with an end being manually secured to a built in take up spool in the camera. After exposure, the film, which has no protective backing, must be rewound onto the supply spool. The sprocket holes make a considerable area of the film unusable and the sprocket wheel causes difficulty in loading, and possible jamming and tearing of the film. Present inexpensive cartridge type cameras employ enclosed cartridges with the film on pre-loaded supply and take up spools. An inner lower opening in the web between the film chambers fits over the camera aperture guide while a small opening on the back displays the exposure number on the film protective backing. This enclosed cartridge allows some looseness or slack in the film over the aperture guide which causes poor resolution.

Use of a camera pressure plate on the back cover to hold the film from a cartridge tightly over an aperture guide has been suggested in U.S. Pat. No. 3,347,142 issued Oct. 17, 1967. The use of two film casings spaced by a rigid member as a magazine, is described in U.S. Pat. No. 3,482,681 issued Dec. 9, 1969. The cartridges, casings and spools, however, are not symmetrical to permit reversal of the film. Use of a reversible film in conjunction with masks to permit doubling of the number of exposures on a film roll or variation of sizes also has previously been suggested in another camera type described in U.S. Pat. No. 3,678,834 of the present inventor, issued July 25, 1972. This concept, however, has not previously been applied to film cartridges which can be used with 35mm single lens reflex type cameras.

SUMMARY OF THE INVENTION

It is therefore the primary object of the present invention to provide an improved film cartridge and camera that can achieve more efficient use of the film.

It is another object to provide a compact symmetrical reversible film cartridge for a camera which can provide a choice of exposure sizes or two rows of exposures on one roll of film.

It is an additional object to provide a reusable cartridge case that accommodates reversible film casings.

It is a further object to provide a simplified camera structure employing a film cartridge which permits elimination of camera sprocket wheels, corresponding holes in the film and the usual need for rewinding.

These objects are accomplished with a symmetrical film cartridge including two like film spools held in two like casings spaced and supported by a side bar or in a hinged reusable cartridge case. The cartridge is open at the back to permit the pressure plate within the back cover of the camera to press the film tightly against the aperture guide. The cartridge is coupled to a film driving mechanism in the camera which eliminates the need for a built in spool, sprocket drive, rewinding mechanism, and film with sprocket holes, and increases the usable film width. The ends of the spools and sides of the casings or cartridge case are made symmetrical to permit either side to engage the driving mechanism. The leaders at both ends of the film are also attached to both spools, with the cartridge being reversible to obtain double the number of exposures. By using removable aperture and viewing masks to block one half the film, exposures are limited to one narrow row as the film is advanced in the forward direction and a second row when the cartridge is reversed and the film wound oppositely. Larger rectangular or square frame exposures extending across the film may also be obtained without reversal of the cartridge. Other objects and advantages will become apparent from the following description taken in conjunction with the accompanying drawings.

BRIEF DESCRIPTION OF THE DRAWINGS

FIG. 1 is a side view of a symmetrical reversible film cartridge in accordance with the present invention;

FIG. 2 is a plan view the film cartridge of FIG. 1;

FIG. 3 is a side partial cross sectional view of the interior of a camera incorporating the film cartridge of the present invention;

FIG. 4 is a plan view of the camera of FIG. 3 with the back cover and cartridge removed;

FIG. 5 is a plan view of an aperture or viewing mask used in conjunction with the camera and cartridge to provide two rows of exposures on one reversible film strip;

FIG. 6 is a view of a portion of a film strip showing two rows of exposures;

FIG. 7 is a portion of a film strip showing alternative exposure sizes that can be employed with the same film and cartridge; and FIG. 8 is an isometric view of a hinged reusable symmetrical cartridge case that can accommodate reversible film casings and spools.

DESCRIPTION OF THE PREFERRED EMBODIMENTS

As shown in FIGS. 1 and 2, a film supply drum or casing 10 encloses a rotatable supply spool having a hollow cylindrical shaft extending out of a central opening in the side of the casing. The leader at one end of a roll of film 12 is attached to the supply spool. The opposite leader end of the film is also attached to a second rotatable take up spool enclosed within a take up drum or casing 14 having another hollow cylindrical shaft extending out of the central side opening thereof. The casings 10, 14, with the respective spools and shaft extensions, are preferably symmetrical so that either one can be used in either direction as a take up or supply unit. A pair of side support bars 16, 18 are secured to the central extensions 20, 22 of the film spool shafts at each side of the casings to hold the casings in a fixed spaced position and form a reversible film cartridge unit. A single support bar on one side may also be used and may be detachable to permit the film connected casings to occupy a smaller area or be inserted individually into a camera. Each spool extension includes an internal bevel gear 24, 26 extending into the hollow cylindral shaft on each side to cooperate with a driving mechanism in the camera for feeding and winding the film.

As shown in FIG. 3, when the film cartridge unit with the two spaced casings 10, 14 is inserted into the back of a single lens reflex type camera 28, the bevelled gears 24, 26 engage mating spring loaded posts with bevelled driving gears 30, 32, shown in FIG. 4, extending from the side of the camera into semicylindrical supply and take up compartments 34, 36 which receive the film cartridge and casings. The driving gear posts are connected to an external rotatable film winding knob 38 and the film advance mechanism and lever 40. A standard film advance indicator or counter is employed to show the number of exposures. Knob 38 and driving gear 30 may be eliminated if desired, since film advance lever 40 and gear 32 can satisfactorily drive the film. The rotatable ends of the supply spool can then be supported within cylindrical recesses at the opposite sides of the supply compartment and back cover. The pre-loaded film 12 from the supply spool and casing 10 is guided over the film aperture guide 42 onto the take up spool and casing 14 as the film advance lever is moved to position each successive frame over the aperture. The open area 44 in the upper face of the cartridge over the film and aperture permits the spring loaded pressure plate 46 on the camera back cover 48 to press the film tightly against the aperture guide 42. This holds the film flat in the focal plane to eliminate looseness of the film and provide improved resolution. When all exposures are taken and the film roll is wound on to the take up spool, the leader end remains attached to the supply spool.

Use of the spaced supported casings as a film cartridge, in conjunction with the driving gears, permits elimination of the usual built in take up spool, sprocket wheel and sprocket holes in the film to provide more useful film area, simplify loading, and avoid jamming. Since the casings and spools are symmetrical, when the film roll is completely wound onto the take up spool, the cartridge can be taken out, reversed, and replaced in the two chambers 34, 36 for movement of the film from the opposite end. As shown in FIGS. 5 and 6, use of an aperture mask 50 over aperture guide 42 masks one half the width of the film during movement in the original direction and permits exposure of only the other half 52. The reversed film roll can then be advanced again, with the mask in the same position, so that the take up spool now acts as the supply spool and vice versa. This results in a second row of exposures being taken along the opposite half of the film 54 without any intermediate rewinding. This permits double the usual number of exposures to be obtained on one film strip. A corresponding viewing mask is placed over the window in view finder 56 so that the exposure frames are coordinated with the view of the photographer.

As shown in FIG. 7, the same flim strip and cartridge may be used in a normal manner to take one full sized row of rectangular exposures 57 of about 31mm width by 38mm length, for example, without reversing the film and without using an aperture mask. The standard 35mm film width is thus more fully utilized by elimination of the usual sprocket holes along each edge. A further variation may employ an aperture mask at the upper and lower portion of the exposure frame along the film length as indicated by dashed lines, to obtain a square sized exposure 55. By using a larger film width, such as 46mm, and a frame length of 35mm, a square format of 35 × 35mm can be obtained with a mask at the outer edges of the width. Thus, various formats are obtainable with the cartridge and camera of the present invention.

Another type of film cartridge 58 is shown in FIG. 8. In this case, the cartridge is hinged at one end 60 and has a snap closure at end 62. The casings 10, 14, with the geared spools and pre-loaded attached film, are readily inserted into openings 64, 66 on both sides at opposite ends and the cartridge is closed and placed in chambers 34, 36 of the camera. The geared ends of the spools extend through the side openings to engage the teeth of the spring loaded driving gears 30, 32 and the film is then advanced between the closed upper and lower horizontal web sections 68, 70 of the cartridge case. The lower section 70 includes an opening 72 which fits over the aperture guide 42 and upper section 68 has a like opening 74 which permits the spring loaded pressure plate 46 on the back cover of the camera to extend through the opening to press the film against the aperture guide. After the first row of exposures on one half the film width is completed, using aperture mask 50, the cartridge is reversed and the film along the other half is exposed, frame by frame. When the entire roll is completed, the cartridge is readily opened and the casings removed for development and processing of the film. The cartridge case is of a light tight flexible plastic and is reusable to facilitate reloading with new film spools and casings. In a further variation, the casings may be made to open to insert or remove the film spools. The size of the cartridge can be varied to accept any film width or length for any size still camera.

While only a limited number of embodiments have been illustrated and described, many other variations may be made in the particular design and configuration without departing from the scope of the invention as set forth in the appended claims.

What is claimed is:

1. A film cartridge comprising: first and second light tight film casings;
    a film supply spool within said first casing;
    a film take up spool within said second casing,
        said take up and supply spools and casings being symmetrical and interchangeable, each said casing having opposite sides with central openings in each said side, each said spool having a hollow cylindrical shaft with annular extensions on each end extending through and out of each said casing opening;
    support means extending between and around said annular extensions for holding said casings in a spaced relationship for insertion into a camera, said support means extending along open areas in upper and lower regions between said casings, said upper open area being adapted to receive the pressure plate of a camera cover, and said lower open area being adapted to fit over the camera film aperture guide;
    a film roll extending between said casings and being connected at opposite ends to each spool; and driving means extending within said ends of each spool.

2. The device of claim 1 wherein said driving means are bevelled gear teeth within the ends of each spool.

3. The device of claim 1 wherein said support means is a bar extending between and around the ends of each spool on one side of said casings.

4. The device of claim 3 including a second bar between the opposite ends of each spool, said bars being detachable.

5. The device of claim 1 wherein said support means comprises an enclosed cartridge case having upper and lower sections with a hinged connection at one end, a closure means at the opposite end to permit opening and closing of said upper and lower sections at said opposite end for insertion of said casings and film spools and securing said sections together, a pair of receiving chambers within the opposite ends of said cartridge case for receiving and enclosing said casings and spools, said open areas between said casings being rectangular openings in the upper and lower sections, said upper and lower sections having mating longitudinal sides extending between said opposite ends, and side openings at opposite sides of each end extending into said chambers for accommodating the ends of each spool.

6. A camera for use with the film cartridge of claim 1 having pairs of symmetrical interchangeable supply and take up film casings and spools in said casings at opposite ends, and upper and lower open areas between said casings comprising:

a housing including a supply compartment and a take up compartment at opposite ends for receiving respective said symmetrical interchangeable film casings, spools, and support means;

a film aperture guide including a light admitting aperture between said compartments for guiding film from said cartridge over said aperture;

film driving means extending into a side of said take up compartment for engaging said driving means of said take up spool to advance said film between said compartments over said aperture guide;

a cover enclosing the back of said camera housing over said compartments; and a pressure plate within said cover adapted to extend through said upper opening between said casings to urge said film against said aperture guide.

7. The camera of claim 6 including second film driving means extending into a side of said supply compartment for engaging said drawing means of said supply spool, aperture masking means for masking one side of the width of said film while admitting light only onto the other side of the width of said film to permit a first row of exposures along only said other side of said film as the film is advanced from said supply spool to said take up spool and permitting a second row of exposures along said one side upon reversal of said film cartridge in said compartments and reversal of the movement of film so that said take up spool becomes a supply spool and said supply spool becomes a take up spool.

8. The device of claim 7 wherein said film driving means include spring loaded posts having bevelled gear teeth at the ends.

9. The device of claim 7 including a viewing window and a viewing mask for masking one side of the viewing window to correspond with said aperture masking means.

* * * * *